United States Patent [19]
Tanaka et al.

[11] Patent Number: 5,274,542
[45] Date of Patent: Dec. 28, 1993

[54] CONTROL DEVICE OF NEUTRAL POINT CLAMPED POWER INVERTER APPARATUS

[75] Inventors: Shigeru Tanaka; Kazutoshi Miura, both of Tokyo, Japan

[73] Assignee: Kabushiki Kaisha Toshiba, Kawasaki, Japan

[21] Appl. No.: 841,816

[22] Filed: Feb. 26, 1992

[30] Foreign Application Priority Data

Feb. 28, 1991 [JP] Japan .................. 3-33912

[51] Int. Cl.5 ............................ H02M 7/521
[52] U.S. Cl. ........................ 363/96; 363/98; 363/132; 363/136
[58] Field of Search .............. 363/41, 96, 98, 132, 363/136

[56] References Cited

U.S. PATENT DOCUMENTS

| 4,270,163 | 5/1981 | Baker . | |
| 4,855,893 | 8/1989 | Kratz | 363/136 |
| 4,881,159 | 11/1989 | Holtz et al. | 363/58 |
| 4,961,129 | 10/1990 | Shekhawat | 363/98 X |
| 5,060,129 | 10/1991 | Maruyama | 363/41 |
| 5,120,986 | 6/1992 | Shekhawat | 363/98 X |
| 5,130,917 | 7/1992 | Shekhawat | 363/131 X |

FOREIGN PATENT DOCUMENTS

| 0144593 | 6/1985 | European Pat. Off. . |
| 1538672 | 2/1970 | Fed. Rep. of Germany . |
| 1658608 | 3/1972 | Fed. Rep. of Germany . |
| 3540113 | 4/1987 | Fed. Rep. of Germany . |
| 4021766 | 1/1992 | Fed. Rep. of Germany . |
| 5543996 | 3/1980 | Japan . |
| 5674088 | 6/1981 | Japan . |

OTHER PUBLICATIONS etzArchiv, vol. 10, issue 7, 1988, pp. 215–220, J. K. Steinke, "Grundlagen Fur Die Entwicklung Eines Steuerverfahrens Fur GTO–Dreipunktwechselrichter Fur Traktionsantriebe".
IEEE Transactions on Industry Applications, vol. 24, No. 6, Nov./Dec. 1988, pp. 987–1004, Bimal K. Bose, "A High-Performance Inverter-Fed Drive System of an Interior Permanent Magnet Synchronous Machine".

Primary Examiner—Emanuel T. Voeltz
Attorney, Agent, or Firm—Oblon, Spivak, McClelland, Maier & Neustadt

[57] ABSTRACT

A power inverter control device is designed to control a neutral point clamped power inverter apparatus including first to fourth self-extinction elements sequentially connected in series between two end terminals of a power supply having an intermediate terminal, four freewheeling diodes connected in parallel with the self-extinction elements in a direction opposite thereto, a series circuit of first and second clamping diodes, connected in parallel with a series circuit of the second and third self-extinction elements in a direction opposite thereto and having a node connected to the intermediate terminal of the power supply. The control device includes a circuit for generating a first PWM control signal having a pulse width corresponding to a load current, and a PWM control circuit for converting the first PWM control signal into a second PWM control signal having a pulse width equivalent to the sum of the pulse width of the first PWM control signal and a width corresponding to one of turn-on and turn-off periods of each of the self-extinction element, and supplying the second PWM control signal to the first to fourth self-extinction elements.

18 Claims, 10 Drawing Sheets

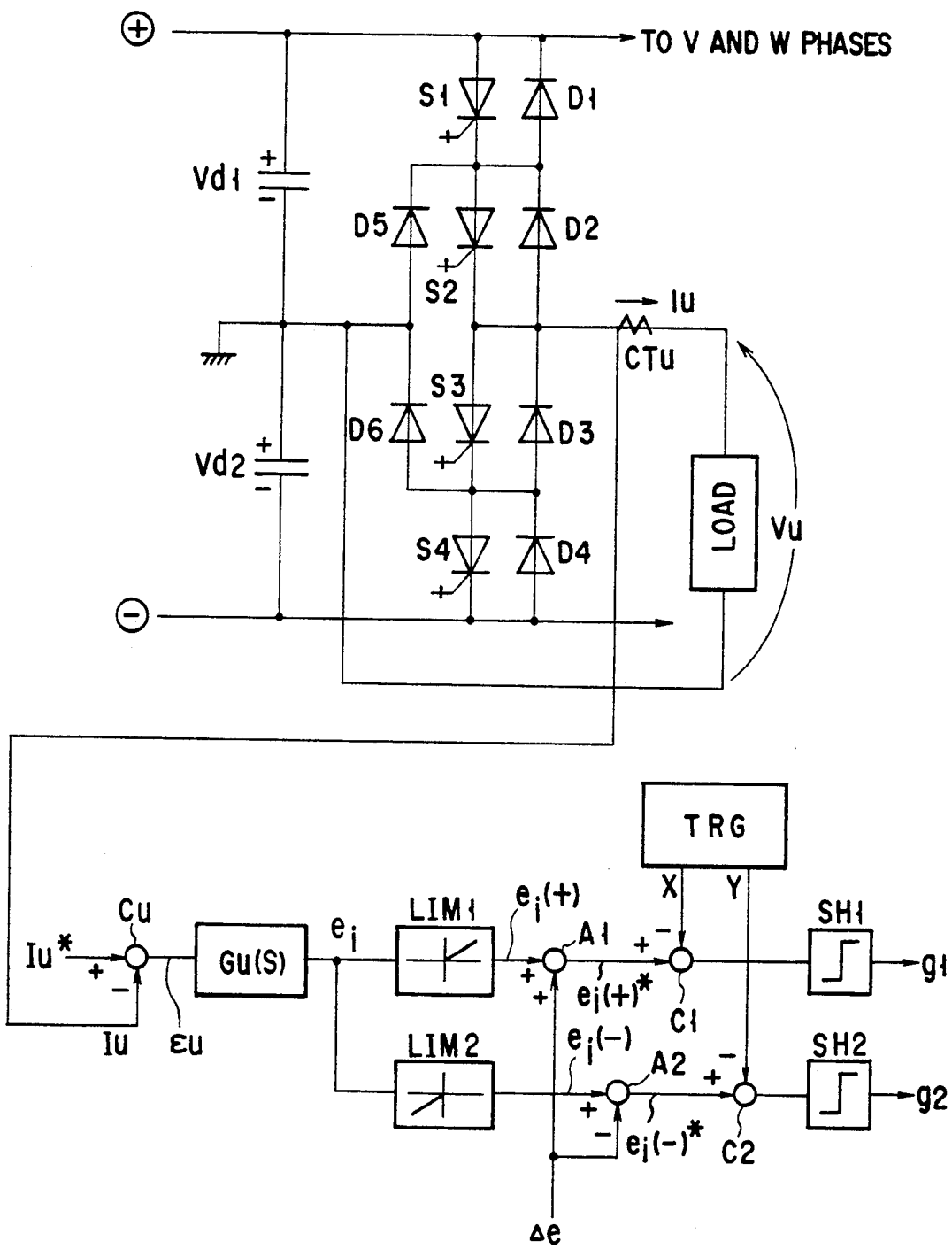
F I G. 4

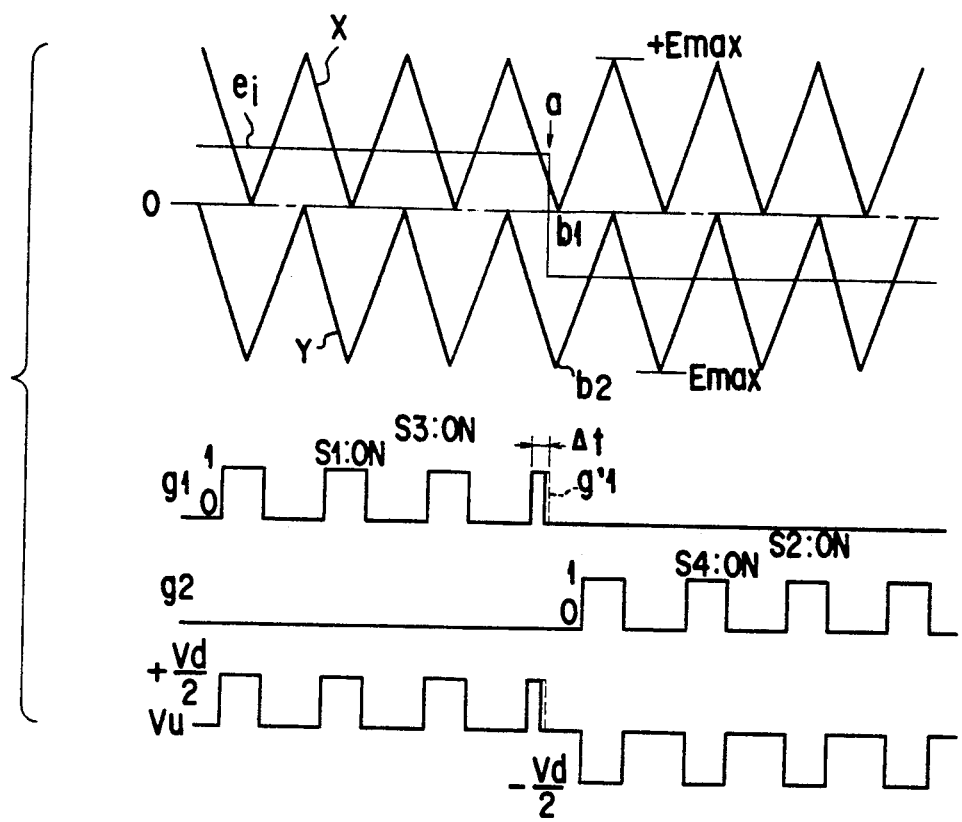
F I G. 7
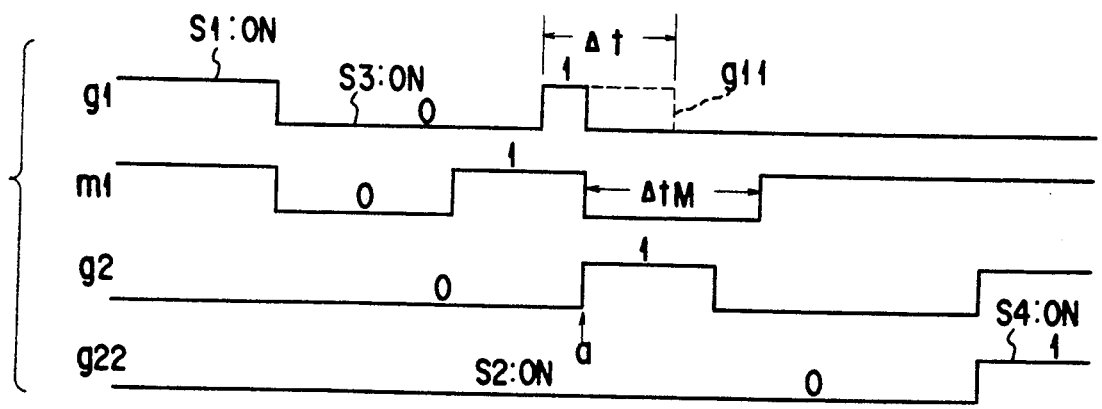
F I G. 9

CONTROL DEVICE OF NEUTRAL POINT CLAMPED POWER INVERTER APPARATUS

BACKGROUND OF THE INVENTION

1. Field of the Invention

The present invention relates to a control device of a neutral point clamped power inverter apparatus designed to generate a three-level output voltage and applied to a pulse width modulation (PWM) control converter apparatus for converting AC power into DC power, a PWM control inverter apparatus for converting DC power into AC power, and the like.

2. Description of the Related Art

In the main circuit of a conventional neutral point clamped power inverter apparatus shown in FIG. 1, reference symbols Vd1 and Vd2 denote DC power supplies; S1 to S4, self-extinction elements; D1 to D4, freewheeling diodes; D5 and D6, clamping diodes; and LOAD, a load. An output voltage Vu from this inverter apparatus changes upon ON/OFF operations of the four elements S1 to S4 in the following manner. Note that a total DC voltage Vd is represented by the following equation:

$$Vd1 = Vd2 = Vd/2$$

When the elements S1 and S2 are ON, $Vu = +Vd/2$.
When the elements S2 and S3 are ON, $Vu = 0$.
When the element S3 and S4 are ON, $Vu = -Vd/2$.

In this case, the self-extinction elements must be turned on in pairs. If three of the elements are turned on at once, a corresponding DC power supply is short-circuited, and the elements are distracted by an overcurrent.

If, for example, ON signals are respectively input to the elements S1 to S3, the DC power supply Vd1 is short-circuited through the elements S1, S2, and S3 and the diode D6. As a result, an excessive short-circuit current flows to the elements to destruct them.

In order to prevent such a DC short circuit, the elements S1 and S3 are inversely operated, while the elements S2 and S4 are inversely operated. That is, when the element S1 is turned on, the element S3 is turned off, and vice versa. In this case, since the elements S1 and S3 are not immediately turned off upon reception of OFF gate signals, an OFF signal is kept supplied to one of the elements until the other element is completely turned off. The corresponding period of time is called an idle time, which has been considered as an indispensable factor. Similarly, when the element S2 is turned on, the element S4 is turned off with an idle time, and vice versa.

The conventional neutral point clamped power inverter apparatus, therefore, is operated in accordance with a pulse width modulation control method indicated by the timing chart shown in FIG. 2.

Referring to FIG. 2, reference symbols X and Y denote carrier signals of PWM control. The signal X is a triangular wave which changes in level between $+EMAX$ and $-EMAX$. The signal Y has the inverted value of the signal X (or a triangular wave whose phase is shifted from that of the signal X by an electric angle of 180°). In addition, reference symbol ei denotes a PWM control input signal.

Gate signals g1 and g2 for the elements S1 to S4 are formed by comparing the input signal ei with the triangular waves X and Y. More specifically, If $ei > X$ and $ei > Y$, $g1 = 1$ is formed to turn on the element S1 and turn off the element S3.
If $ei \leq X$ or $ei \leq Y$, $g1 = 0$ is formed to turn off the element S1 and turn on the element S3.
If $ei < X$ and $ei < Y$, $g2 = 1$ is formed to turn on the element S4 and turn off the element S2.
If $ei \geq X$ or $ei \geq Y$, $g2 = 0$ is formed to turn off the element S4 and turn on the element S2.

As a result, the output voltage Vu has the waveform illustrated at the lowest position in FIG. 2. In this manner, in the neutral point clamped power inverter apparatus, a voltage having a three-level ($+Vd/2$, 0, and $-Vd/2$) voltage waveform with a small amount of high-frequency components can be obtained as the output voltage Vu. When such a voltage is applied to a motor load, current pulsation can be reduced, and a reduction in torque ripple can be achieved.

The following problems, however, are posed in the above-described conventional neutral point clamped power inverter apparatus.

If the level of the input signal ei is very low, as shown in FIG. 3, the pulse width of each of the gate signals g1 and g2 is reduced. If this pulse width becomes shorter than a minimum ON time $\Delta t$ of the elements S1 to S4 constituting the inverter apparatus, a problem is posed as follows.

In a large-capacity inverter apparatus, a GTO (gate turn-off) thyristor is used as a self-extinction element, and a snubber circuit for restricting an over-voltage in a turn-off period is connected to the GTO thyristor. When the GTO thyristor is turned on to initialize (discharge) the voltage of a capacitor in this snubber circuit, the ON state of the GTO thyristor must be maintained for a predetermined period of time (the minimum ON time $\Delta t$: e.g., about 100 microseconds).

In the case shown in FIG. 3, the input signal ei is decreased in level, so that the time interval during which the gate signal g1 is at "1" level, i.e., the time interval during which the element S1 is ON (the element S3 is OFF), becomes shorter than the minimum ON time $\Delta t$. Therefore, in order to secure the minimum ON time of the element, the gate signal g1 is corrected to form a signal g1' having a pulse width corresponding to the minimum ON time $\Delta t$. Similarly, the gate signal g2 is corrected to form a signal g2'. As a result, the output voltage Vu has the waveform at the lowest position in FIG. 3. Consequently, the average value Vu of output voltages is a constant positive or negative value regardless of the value of the input signal ei, as indicated by dotted lines in FIG. 3.

That is, according to the control device of the conventional neutral point clamped power inverter apparatus, when the level of the input signal ei is decreased, the output voltage Vu becomes a constant value regardless of the value of the input signal ei. This renders it impossible to control a load current Iu. Especially when an output frequency is low, voltage errors are accumulated to increase the load current Iu. In the worst case, the corresponding element is distracted.

In addition, if an abrupt change in level of the input signal ei occurs, the pulse width of the gate signal g1 is increased to secure the minimum ON time $\Delta t$ of the element S1. As a result, since the gate signal g1, whose pulse width is increased, partially overlaps the gate signal g2, the element S1 is turned on, the element S2 is turned off, the element S3 is turned off, and the element S4 is turned on. Therefore, the total DC voltage Vd=Vd1+Vd2 is applied to the element S2 or S4 to destruct the element S2 or S4.

The above-described conventional problems can be summarized as follows:

a. When the level of the input signal ei is low, it is impossible to control the self-extinction elements.

b. In order to prevent a DC short circuit, an idle time is required to control each self-extinction element.

c. If an abrupt change in level of the input signal ei occurs, an overvoltage is applied to a corresponding self-extinction element, and the element is distracted.

SUMMARY OF THE INVENTION

It is an object of the present invention to provide a control device of a neutral point clamped power inverter apparatus, which can secure the minimum ON time of each element, and generates an output voltage proportional to an input signal ei when the level of the input signal is low, thereby eliminating uncontrollable regions.

It is another object of the present invention to provide a control device of a neutral point clamped power inverter apparatus, which requires no wasteful OFF time in control of each self-extinction element.

It is still another object of the present invention to provide a control device of a neutral point clamped power inverter apparatus, which can prevent each element from being distracted by an abrupt change in level of an input signal.

According to the first aspect of the present invention, there is provided a power inverter control device for controlling a neutral point clamped power inverter apparatus including first to fourth self-extinction elements sequentially connected in series between the terminals of a power supply having an intermediate terminal, four freewheeling diodes connected in parallel with the self-extinction elements in a direction opposite thereto, a series circuit of first and second clamping diodes, connected in parallel with a series circuit of the second and third self-extinction elements in a direction opposite thereto and having a node connected to the intermediate terminal of the power supply, the control device comprising a circuit for generating an original PWM control signal having a pulse width corresponding to an input signal level, and PWM control signal generating means for converting the original PWM control signal into a PWM control signal having a pulse width equivalent to the sum of the pulse width of the original PWM control signal and a width corresponding to one of turn-on and turn-off periods of each of the self-extinction elements, and supplying the converted PWM control signal to the first to fourth self-extinction elements.

According to the second aspect of the present invention, there is provided a power inverter control device for controlling a neutral point clamped power inverter apparatus including first to fourth self-extinction elements sequentially connected in series between the terminals of a power supply having an intermediate terminal, four freewheeling diodes connected in parallel with the self-extinction elements in a direction opposite thereto, a series circuit of first and second clamping diodes, connected in parallel with a series circuit of the second and third self-extinction elements in a direction opposite thereto and having a node connected to the intermediate terminal of the power supply, the control device including a triangular wave signal generating circuit for generating a first triangular wave signal which changes in level on a positive side, and a second triangular wave signal which is in phase with the first triangular wave signal and changes in level on a negative side, and a circuit for comparing an input signal with the first and second triangular wave signals from the triangular wave signal generating circuit to generate PWM control signals, each having a pulse width corresponding to a level of the input signal, and supplying the control signals to the self-extinction elements.

According to the third aspect of the present invention, there is provided a power inverter control device for controlling a neutral point clamped power inverter apparatus including first to fourth self-extinction elements sequentially connected in series between the terminals of a power supply having an intermediate terminal, four freewheeling diodes connected in parallel with the self-extinction elements in a direction opposite thereto, a series circuit of first and second clamping diodes, connected in parallel with a series circuit of the second and third self-extinction elements in a direction opposite thereto and having a node connected to the intermediate terminal of the power supply, the control device including a circuit for supplying gate signals to the self-extinction elements to switch a positive output mode in which the first and second self-extinction elements are ON, a zero output mode in which the second and third self-extinction elements are ON, and a negative output mode in which the third and fourth self-extinction elements are ON, in such a manner that switching from the positive mode to the negative mode or from the negative mode to the positive mode is always performed through the zero output mode.

According to a fourth aspect of the present invention, there is provided a power inverter control device for controlling a neutral point clamped power inverter apparatus including first to fourth self-extinction elements sequentially connected in series between the terminals of a power supply having an intermediate terminal, four freewheeling diodes connected in parallel with the self-extinction elements in a direction opposite thereto, a series circuit of first and second clamping diodes, connected in parallel with a series circuit of the second and third self-extinction elements in a direction opposite thereto and having a node connected to the intermediate terminal of the power supply, the control device including a current direction detecting circuit for detecting a direction of an output current from the power inverter apparatus, and outputting first and second detection signals respectively corresponding to a first direction and a second direction opposite thereto, and a circuit for turning off the first and second self-extinction elements in response to the first detection signal, and turning off the third and fourth self-extinction elements in response to the second detection signal.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention.

FIG. 4 is a block diagram showing a control device of the neutral point clamped power inverter apparatus according to an embodiment of the present invention together with the arrangement of the main circuit of the apparatus;

FIG. 7 is a timing chart for explaining an operation of the control device in FIG. 6;

FIG. 9 is a partially enlarged view of the timing chart in FIG. 8;

DETAILED DESCRIPTION OF THE PREFERRED EMBODIMENTS

Figure 1:
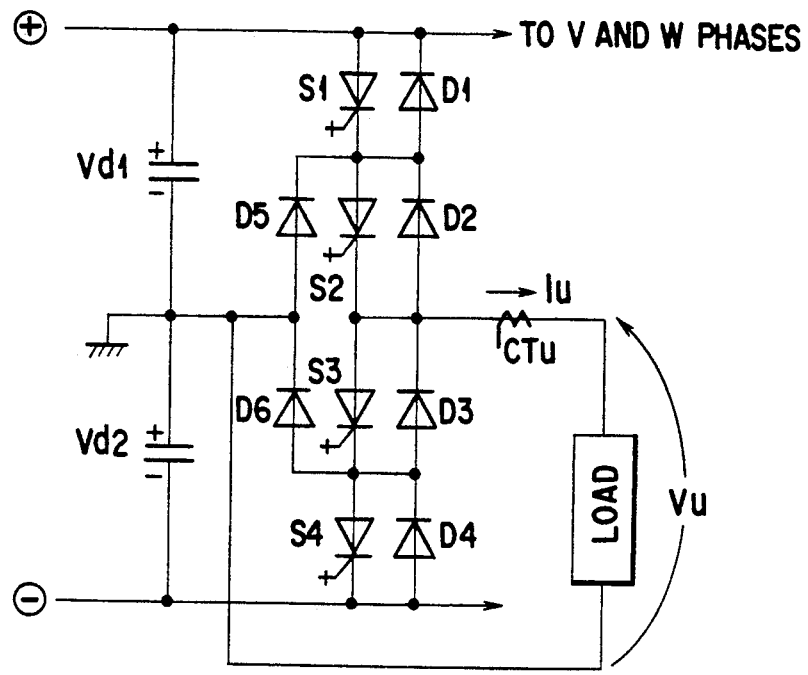
FIG. 1 is a circuit diagram showing the arrangement of the main circuit of a conventional neutral point clamped power inverter apparatus.
Figure 2:
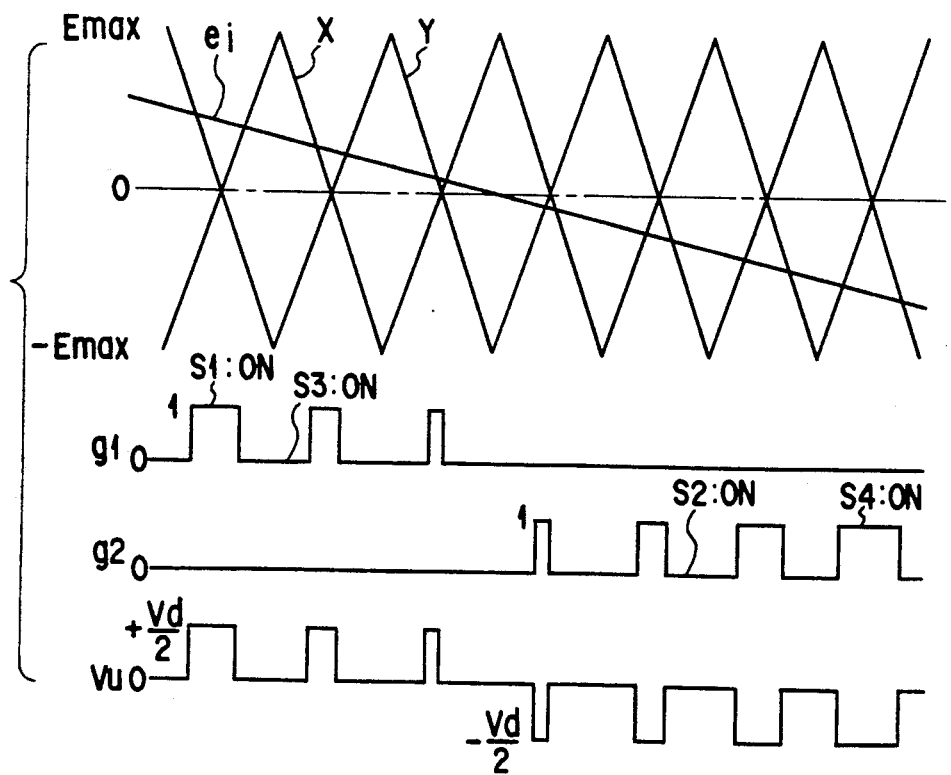
FIG. 2 is a timing chart for explaining an operation of the apparatus controlled by a conventional control device.
Figure 3:
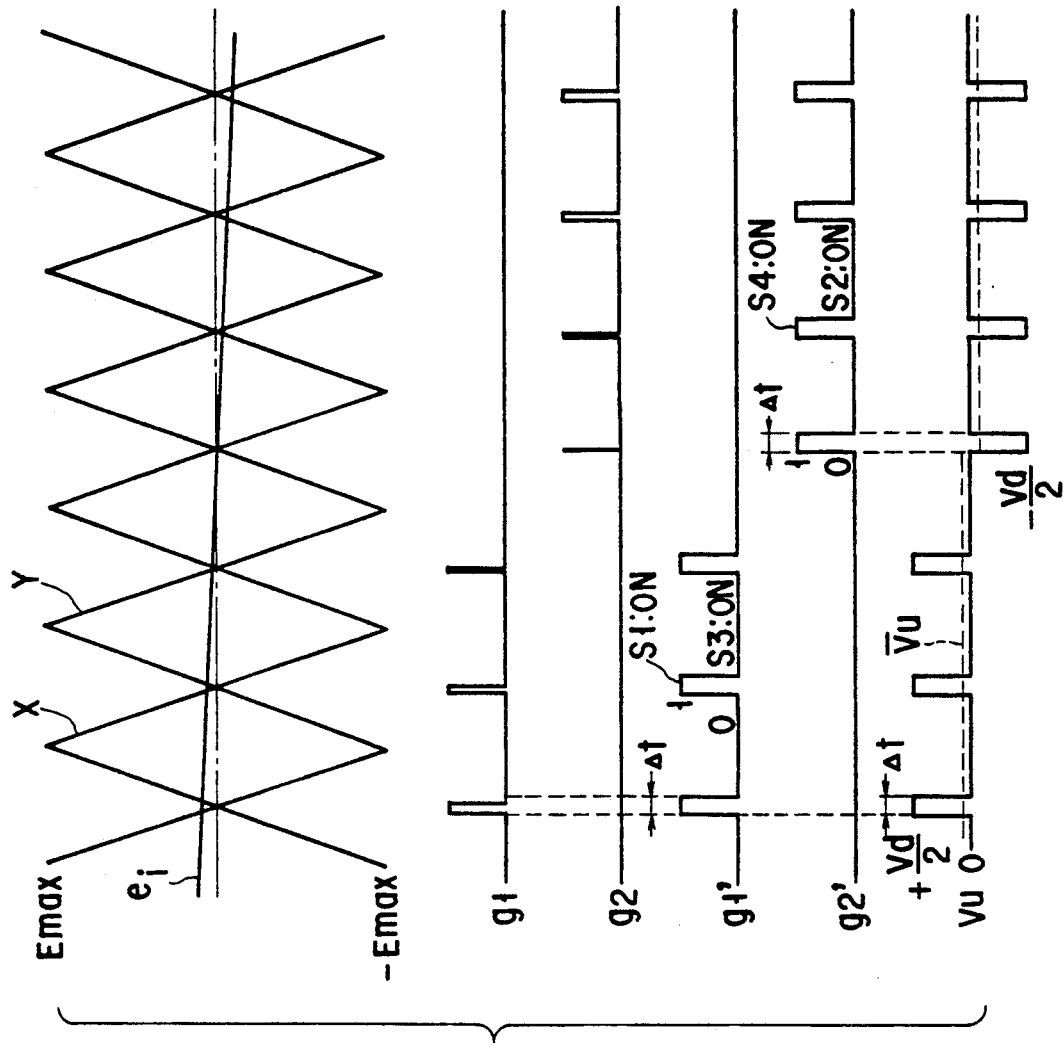
FIG. 3 is a timing chart for explaining problems posed in the conventional control device.

FIG. 4 is a block diagram showing a control device of a neutral point clamped power inverter apparatus according to an embodiment of the present invention together with the arrangement of the main circuit of the apparatus. Although this figure shows a control device for a single phase (U phase), control devices for the remaining two phases (V and W phases) are constructed similarly to the U phase control device.

The output terminal of the current detector CTu is connected to one input terminal of a comparator Cu arranged in a control circuit. A current designation value Iu* is input to the other input terminal of the comparator Cu. The output terminal of the comparator Cu is connected to the input terminals of limiter circuits LIM1 and LIM2 through a current control compensation circuit Gu(s). The output terminal of each of the limiter circuits LIM1 and LIM2 is connected to one input terminal of a corresponding one of adders A1 and A2. A bias voltage $\Delta e$ is applied to the other input terminal of each of the adders A1 and A2. The output terminal of each of the adders A1 and A2 is connected to one input terminal of a corresponding one of comparators C1 and C2. The other input terminal of the comparator C1 and that of the comparator C2 are respectively connected to the X and Y output terminals of a triangular wave generator TRG. The output terminals of the comparators C1 and C2 are respectively connected to the input terminals of Schmitt circuits SH1 and SH2.

In the above-described circuit, a U-phase load current Iu is detected by the current detector CTu and is input to the comparator Cu of the current control circuit. The comparator Cu compares the current designation value Iu* with the current detection value Iu to obtain a deviation $\epsilon u = Iu^* - Iu$. The deviation $\epsilon u$ is amplified by the current control compensation circuit Gu(s). The amplified deviation is then input, as an input signal ei, to the limiter circuits LIM1 and LIM2.

The input signal ei is divided into a positive signal ei(+) and a negative signal ei(−) by the limiter circuits LIM1 and LIM2. More specifically, the limiter circuit LIM1 outputs ei(+)=ei when the input signal ei>0. The limiter circuit LIM2 outputs ei(−)=ei when the input signal ei<0.

The output signals ei(+) and ei(−) from the limiter circuits LIM1 and LIM2 are respectively input to the adders A1 and A2. As a result, bias voltages $\pm \Delta e$ are respectively added to the output signals as follows:

$$ei(+)^* = ei(+) + \Delta e$$

$$ei(-)^* = ei(-) - \Delta e$$

The triangular wave generator TRG generates two triangular wave signals X and Y and supplies them to the comparators C1 and C2, respectively. The comparator C1 compares the triangular wave X with the input signal ei(+)* to form a gate signal g1 for the elements S1 and S3 through the Schmitt circuit SH1. The comparator C2 compares the triangular wave signal Y with the input signal ei(−)* to form a gate signal g2 for the elements S2 and S4 through the Schmitt circuit SH2.

Figure 5:
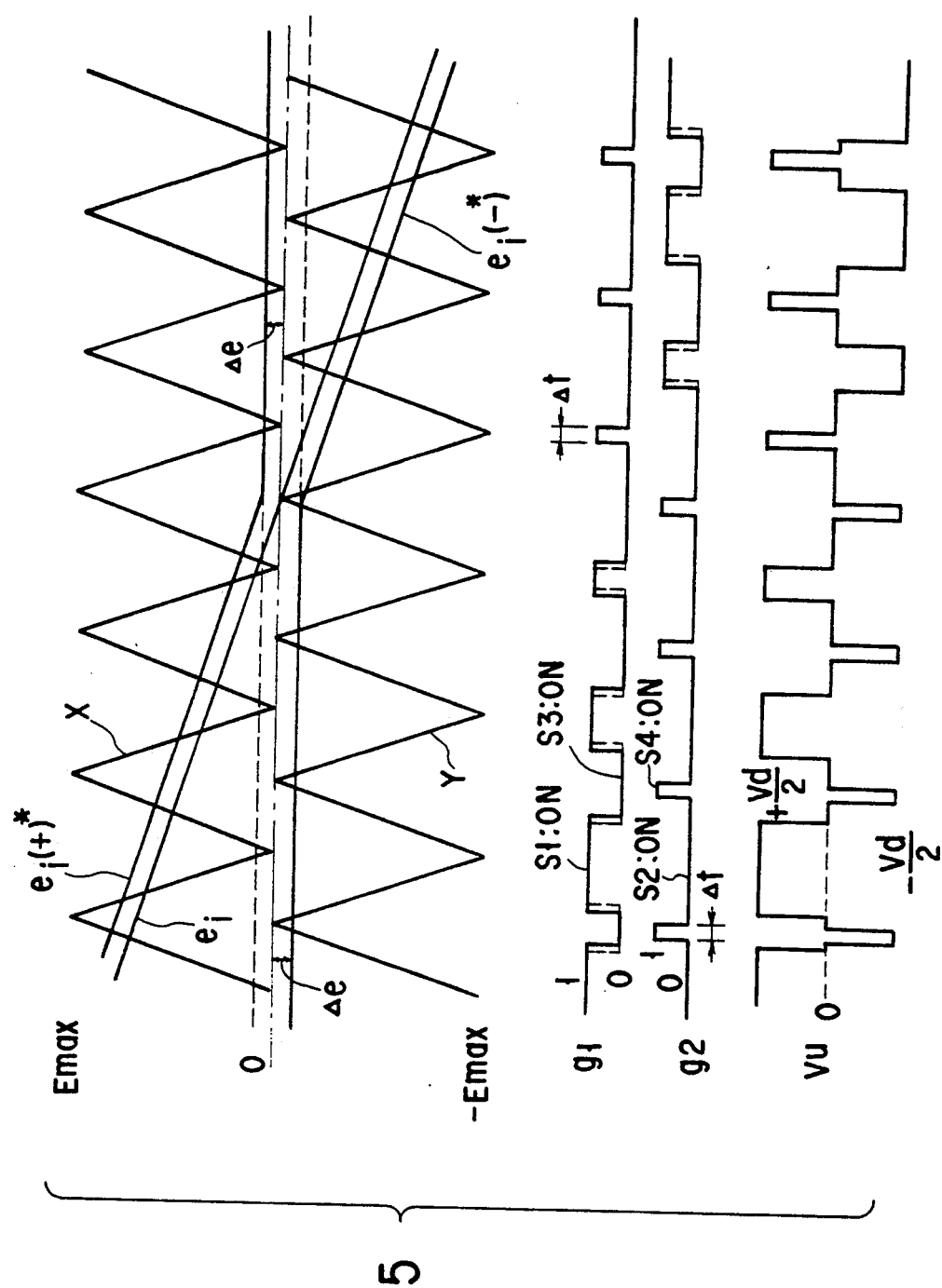
FIG. 5 is a timing chart for explaining an operation of the present invention.

FIG. 5 is a timing chart for explaining an operation of the present invention.

A carrier wave signal X for PWM control is a triangular wave signal which has a constant frequency and changes in level between 0 and +EMAX. A carrier wave signal Y is a triangular wave signal which has a constant frequency, changes in level between 0 and −EMAX, and is in phase with the carrier wave signal X.

That is,
when X= +EMAX, Y=0, and
when X=0, Y= −EMAX.

The signal ei is an output signal from the current control compensation circuit Gu(s), and the signals ei(+)* and ei(−)* are new PWM control input signals obtained through the limiter circuits LIM1 and LMI2 and the adders A1 and A2.

The gate signals g1 and g2 are formed by comparing the new PWM control input signals ei(+)* and ei(−)* with the above-mentioned triangular wave signals X and Y as follows:

When ei(+)*>X, g1=1 is formed to turn on the element S1 (turn off the element S3).

When ei(+)*<X, g1=0 is formed to turn off the element S1 (turn on the element S3).

When ei(−)*<Y, g2=1 is formed to turn on the element S4 (turn off the element S2).

When ei(−)*≧Y, g2=0 is formed to turn off the element S4 (turn on the element S2).

In this case, since the triangular wave signal Y is in phase with the triangular wave signal X, $g2=1$ is not formed when $g1=1$ is formed.

When the gate signals g1 and g2 are obtained by comparing the original input signal ei with the triangular wave signal X, the signals g1 and g2 respectively have waveforms indicated by dotted lines in FIG. 5. The actual time interval of each of the signals $g1=1$ and $g2=1$ is always prolonged by $\Delta t$ in a waveform indicated by a dotted line in FIG. 5. More specifically, according to the present invention, the pulse widths of ON and OFF signals to each element are not reduced below value $\Delta t$ regardless of the magnitude of the original input signal ei, thus always securing the minimum ON time and minimum OFF time of each element.

An output voltage Vu from the inverter apparatus changes upon ON/OFF operations of the elements S1, S2, S3, and S4 in the following manner. Note that the total DC voltage is represented by Vd, and $Vd1 = Vd2 = Vd/2$.

When the elements S1 and S2 are ON, $Vu = +Vd/2$.
When the elements S2 and S3 are ON, $Vu = 0$.
When the elements S3 and S4 are ON, $Vu = -Vd/2$.

As a result, a three-level output voltage can be obtained.

The time interval during which the output voltage $Vu = +Vd/2$ is set is determined by the ON period of the element S1 (the time interval during which $g1=1$). The average of positive voltage components $Vu(+)$ of the output voltage Vu is proportional to the value of the new PWM input signal $ei(+)^*$. Similarly, the time interval during which the output voltage $Vu = -Vd/2$ is set is determined by the ON period of the element S4 (the time interval during which $g2=1$). The average of negative voltage components of the output voltage Vu is proportional to the value of the new PWM input signal $ei(-)^*$.

Although voltages proportional to the bias voltage $\Delta e$ are added to the positive and negative voltages, these voltages cancel each other in view of the total output voltage Vu, and hence the average value Vu is proportional to the original input signal ei.

That is, when the original input signal ei is positive, the pulse widths of all the positive voltage components $Vu(+)$ are respectively increased by the values $\Delta t$, and the average value is increased. However, negative pulses each having a pulse width $\Delta t$ are output between the respective pulses to cancel the increase. When the input signal ei is negative, the pulse widths of all the negative voltage components $Vu(-)$ are respectively increased by the values $\Delta t$ to increase the average value. However, positive pulses each having the pulse width $\Delta t$ are output between the respective negative biases to cancel the increase. In this manner, the output voltage Vu from the inverter apparatus becomes a value proportional to the original input signal ei. Even if the level of the original input signal ei is decreased, the above-described effect can be obtained. According to the present invention, an output voltage proportional to the input signal ei can always be obtained regardless of the magnitude of the input signal ei, thus eliminating uncontrollable regions which pose one of the conventional problems.

Although the frequencies of the carrier wave signals X and Y are constant in the above description, the present invention can be equally applied to a case wherein the carrier wave signals X and Y have variable frequencies as long as the phases of the waves coincide with each other.

In the above-described embodiment, the adders A1 and A2 are respectively connected between the limiter circuit LIM1 and the comparator C1 and between the limiter circuit LIM2 and the comparator C2. However, the adders A1 and A2 may be respectively connected between the comparators C1 and C2 and the output terminal of the triangular wave generator TRG. That is, the bias voltage $\Delta e$ may be added to triangular wave signals in opposite directions instead of adding the bias voltage to the PWM control input signals $ei(+)$ and $ei(-)$. In this case, the original input signal ei is divided into the positive signal $ei(+)$ and the negative signal $ei(-)$, and the signal $ei(+)$ and a rectangular wave X' are compared with each other to form the gate signal g1 for the elements S1 and S3. As the triangular wave X', a value obtained by adding the bias voltage $-\Delta e$ to the signal X from the triangular wave generator TRG is used.

That is, $X' = X - \Delta e$.

When $ei(+) > X'$, $g1=1$ is formed to turn on the element S1 (turn off the element S3).
When $ei(+) \leq X'$, $g1=0$ is formed to turn off the element S1 (turn on the element S3).

In addition, the signal $ei(-)$ and a triangular wave signal Y' are compared with each other to form the gate signal g2 for the elements S2 and S4. Note that $Y' = Y + \Delta e$.

When $ei(-) < Y'$, $g2=1$ is formed to turn on the element S4 (turn off the element S2).
When $ei(-) > Y'$, $g2=0$ is formed to turn off the element S4 (turn on the element S2).

Similar to the gate signals shown in FIG. 5, each of the gate signals g1 and g2 formed in this manner has a pulse width which is always kept longer than the minimum ON time (or the minimum OFF time) $\Delta t$. Therefore, even if the level of the original input signal ei is decreased, the output voltage Vu proportional to the value of the input signal ei can be obtained. That is, PWM control can be continuously performed in all regions, thus solving the conventional problem.

If PWM control is performed while the bias voltage $\Delta e$ is added to the input signal $ei(+)$ or $ei(-)$, the control range of the PWM control is narrowed by an amount corresponding to the bias voltage $\Delta e$, thus decreasing the utilization efficiency of the inverter apparatus. This decrease in utilization efficiency of the inverter apparatus poses a problem especially in a case wherein the absolute value of the input signal ei is increased. Such a decrease in utilization efficiency of the inverter apparatus can be prevented by adding the bias voltage $\Delta e$ to the input signal ei only when the absolute value of the input signal ei is small and setting the bias voltage $\Delta e$ to be zero when the absolute value of the input signal ei is increased.

When the absolute value of the input signal ei is increased to set the bias voltage $\Delta e$ to be zero, a corresponding operation error can be prevented by performing PWM control using the original input signal ei without causing it to pass through the limiter circuits LIM1 and LIM2. The drift of a limiter circuit or an adder poses a problem especially when the inverter apparatus is constituted by an analog circuit. In this case, however, since an original input signal is directly input for PWM control, no problem is posed in terms of drift.

In general, in a motor load or the like, the output voltage and the amplitude (peak value) of the input signal ei for PWM control are increased substantially in proportion to the output frequency of the inverter apparatus. In an AC load, the input signal ei crosses the zero point every ¼ cycle, and an uncontrollable state may occur near the zero point. However, as the output frequency is increased, the corresponding uncontrollable period is shortened, thus substantially eliminating the influence of uncontrollable states as a whole.

The utilization efficiency of the inverter apparatus, therefore, can be increased by eliminating uncontrollable regions by adding the bias voltage $\Delta e$ to the input signal ei only when the output frequency is low, and by setting $\Delta e = 0$ when the output frequency is increased.

As described above, in the control device of the neutral clamped point power inverter apparatus according to the above-described embodiment, even if the level of the input signal ei for PWM control is decreased, the uncontrollable state can be prevented by the minimum ON or OFF time $\Delta t$ of each element, and the output voltage Vu proportional to the input signal ei can be obtained. In addition, a decrease in utilization efficiency of the inverter apparatus can be prevented by switching the bias voltage $\Delta e$ from one value to another value in accordance with the magnitude of the input signal ei or the output frequency.

That is, there is provided a control device of a neutral point clamped power inverter apparatus, in which the minimum ON and OFF times of each element of the inverter apparatus can be secured, and an output voltage proportional to the input signal ei can be generated even if the level of the input signal is low, thereby eliminating uncontrollable regions.

A control device of the neutral point clamped power inverter apparatus according to another embodiment of the present invention will be described below with reference to FIG. 6.

Since the main circuit of this inverter apparatus is identical to that shown in FIG. 4, a description of the circuit arrangement will be omitted.

A control device for controlling the inverter apparatus comprises a comparator Cu for comparing a detection signal from a current detector CTu with a current designation value Iu*, a current control compensation circuit Gu(S) having an input terminal connected to the output terminal of the comparator Cu, comparators C1 and C2 connected to the output terminal of the current control compensation circuit Gu(s) and the X and Y output terminals of a triangular wave generator TRG, respectively, Schmitt circuits SH1 and SH2 respectively connected to the output terminals of the comparators C1 and C2, monostable multivibrators MM1 and MM2 respectively connected to the output terminals of the Schmitt circuits SH1 and SH2, and AND circuits AND1 and AND2 respectively connected to the output terminals of the Schmitt circuits SH1 and SH2 and the output terminals of the monostable multivibrators MM1 and MM2.

According to the above-described embodiment, a U-phase load current Iu is detected by the current detector CTu and is input to the comparator Cu of a current control circuit. The comparator Cu compares the current designation value Iu* with the current detection value Iu to obtain a deviation $\epsilon u = Iu^* - Iu$. The deviation $\epsilon u$ is amplified by the current control compensation circuit Gu(s). The amplified deviation is then input, as an input signal ei, to the comparators C1 and C2.

The triangular wave generator TRG generates triangular wave signals X and Y and supplies them to the comparators C1 and C2. The comparator C1 compares the triangular wave signal X with the input signal ei to form a gate signal g1 for elements S1 and S3 through the Schmitt circuit SH1. The comparator C2 compares the triangular wave signal Y with the input signal ei to form a gate signal g2 for elements S2 and S4 through the Schmitt circuit SH2.

FIG. 7 is a timing chart for explaining an operation of the embodiment.

A carrier wave signal X for PWM control is a triangular wave signal which has a constant frequency and changes in level between 0 and +EMAX. A carrier wave signal Y is a triangular wave signal which has a constant frequency, changes in level between 0 and −EMAX, and is in phase with the carrier wave signal X.

That is,
when $X = +EMAX$, $Y = 0$, and
when $X = 0$, $Y = -EMAX$.

Therefore, the voltage difference between a point b1 ($X = 0$) and a point b2 ($Y = -EMAX$) corresponds to EMAX.

The gate signals g1 and g2 are formed by comparing the PWM control input signal ei with the triangular wave signals X and Y as follows:

When $ei > X$, $g1 = 1$ is formed to turn on the element S1 (turn off the element S3).

When $ei < X$, $g1 = 0$ is formed to turn off the element S1 (turn on the element S3).

When $ei < Y$, $g2 = 1$ is formed to turn on the element S4 (turn off the element S2).

When $ei \geq Y$, $g2 = 0$ is formed to turn off the element S4 (turn on the element S2).

In this case, the output voltage Vu from the inverter apparatus changes as follows. Note that the total DC voltage is represented by Vd, and $Vd1 = Vd2 = Vd/2$.

When the elements S1 and S2 are turned on, $Vu = +Vd/2$.

When the elements S2 and S3 are turned on, $Vu = 0$.

When the elements S3 and S4 are turned on, $Vu = -Vd/2$.

That is, a three-level output voltage is obtained. The average value Vu is proportional to the input signal ei.

Assume that the level of the input signal ei abruptly changes at a point a. In this case, since the pulse width of the gate signal g1 becomes shorter than the minimum ON time $\Delta t$ of the element S1, the signal g1 is converted into a signal g1' indicated by a dotted line in FIG. 7 to secure the minimum ON time $\Delta t$. However, if the change in level of the input signal ei is smaller than the value EMAX, the signal ei does not cross the triangular wave Y at the point a, and the gate signal g2 is kept at "0". Therefore, the time intervals of $g1' = 1$ and $g2 = 1$ do not overlap each other, and the element S2 is always ON while the element S1 is ON. Similarly, while the element S4 is ON, the element S3 is always kept in an ON state.

In other words, while the element S2 is OFF, the element S1 is OFF. In this case, if the output current Iu in FIG. 6 flows in the direction indicated by the arrow, the diodes D3 and D4 are rendered conductive, so that the total voltage Vd is applied to the series circuit of the elements S1 and S2. However, since both the elements are OFF, a voltage Vd/2 is applied to each element. Similarly, when the element S3 is OFF, the element S4 is OFF so that a voltage exceeding Vd/2 is not applied to each element.

According to a conventional PWM control device, if the input signal ei varies near the zero point, there may be an error that the total DC voltage Vd is applied to one of the elements S2 and S3 at the intermediate positions. According to the present invention, however, such an error can be eliminated.

When a plurality of neutral point clamped power inverter apparatuses are prepared, and multiplex PWM of the inverter apparatuses is to be performed by setting proper phase differences between carrier wave signals for PWM control, carrier wave signals which hold the phase relationship between the two triangular wave signals X and Y shown in FIG. 7 are supplied to the respective inverter apparatuses to prevent damage caused by an overvoltage generated upon an abrupt change in load.

In the control device of the neutral point clamped power inverter apparatus according to the above-described embodiment, even if the level of an input signal abruptly changes, control can be performed to avoid the mode of applying a total DC voltage to one element, thereby eliminating the possibility of element damage, as long as the change in level does not exceed an allowed value.

Measures against abrupt changes in level of the input signal ei in a wider range will be described next.

Figure 6:
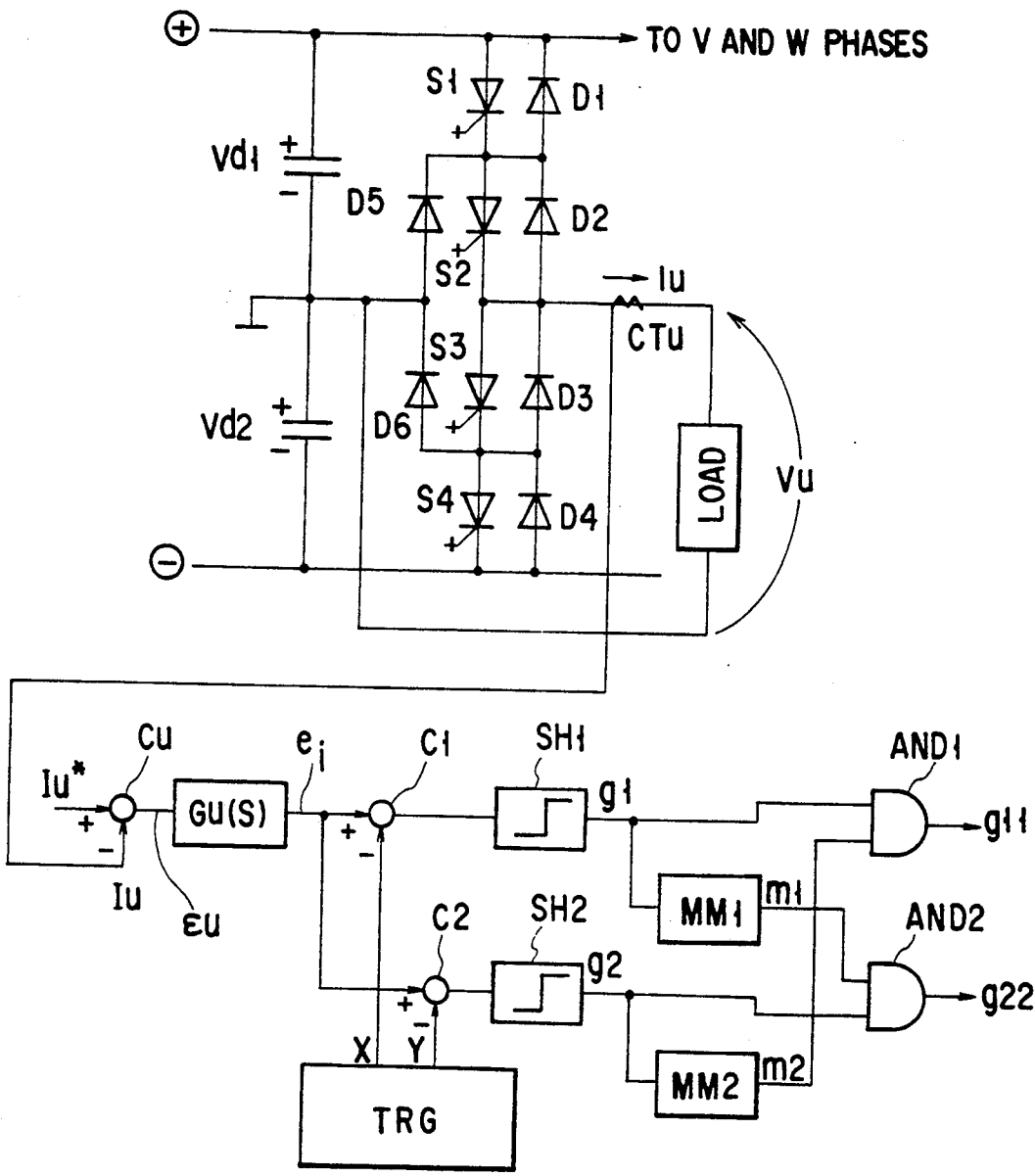
FIG. 6 is a block diagram showing a control device of the neutral point clamped power inverter apparatus according to another embodiment of the present invention together with the arrangement of the main circuit of the apparatus.
Figure 8:
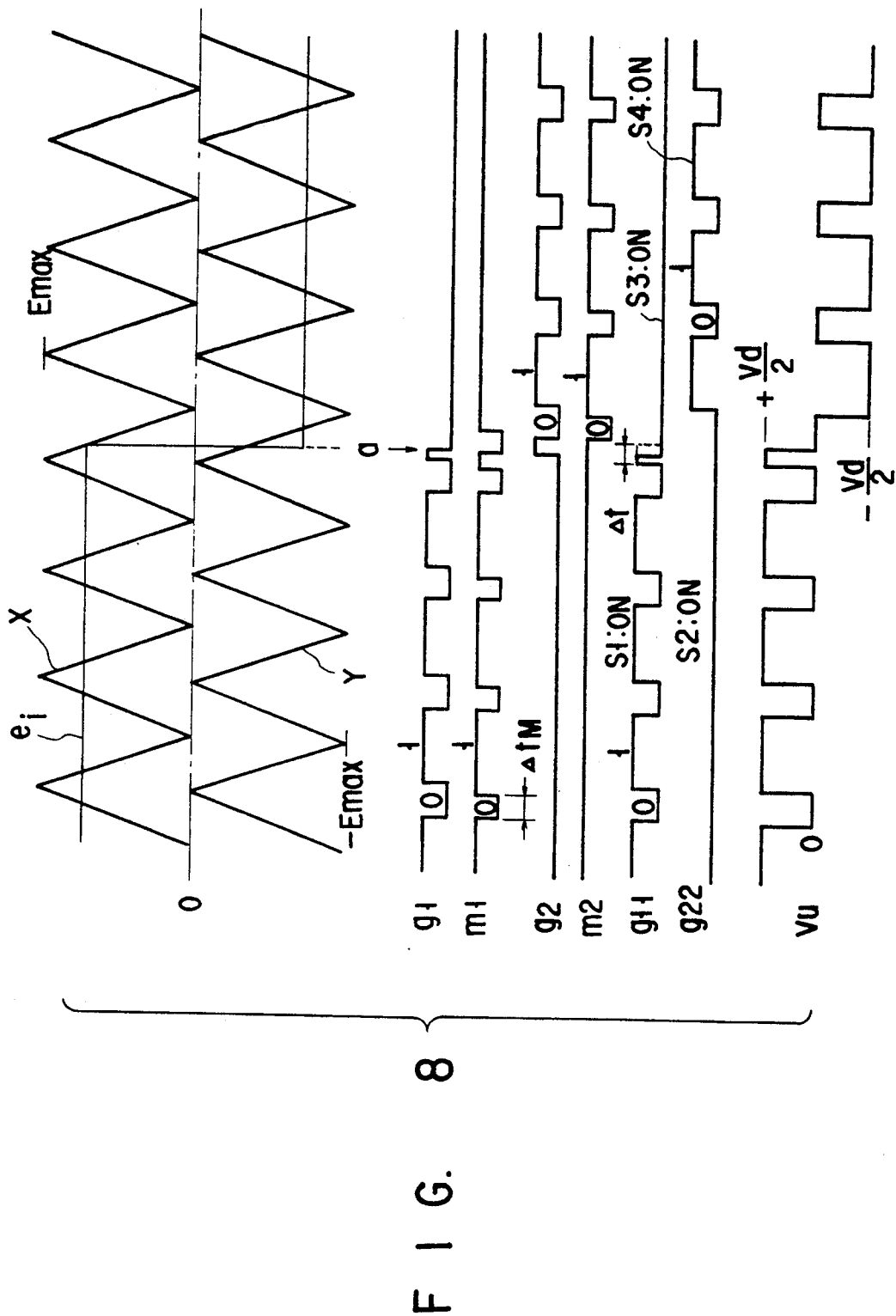
FIG. 8 is a timing chart for explaining an operation of the embodiment in FIG. 6.

In the control circuit shown in FIG. 6, the mono-stable multivibrator MM1 is operated at the trailing edge of the gate signal g1 as a trigger timing. At this time, the monostable multivibrator MM1 generates an output signal which is set at "0" for a time interval $\Delta tM$, as indicated by the timing chart in FIG. 8. Similarly, the monostable multivibrator MM2 is operated at the trailing edge of the gate signal g2 as a trigger timing. With this operation, the monostable multivibrator MM2 generates a signal which is set at "0" for the time interval $\Delta tM$.

The gate signal g1 and the output signal from the monostable multivibrator MM2 are supplied to the AND circuit AND1 to be ANDed, thus forming a new gate signal g11. The gate signal g11 is set at "0" while the output signal from the monostable multivibrator MM2 is at "0", and is set at the same level as that of the gate signal g1 for other time intervals.

Similarly, the AND circuit AND2 performs an AND operation of the gate signal g2 and the output signal from the monostable multivibrator MM1 to form a new gate signal g22. The gate signal g22 is set at "0" while the output signal from the monostable multivibrator MM1 is at "0", and is set at the same level as that of the gate signal g2 for other time intervals.

Assume that, in the control circuit including the above-described monostable multivibrators, the PWM control carrier wave signal X as a triangular wave signal, which changes in level between 0 and $+EMAX$ and has a constant frequency, and the carrier wave signal Y as a triangular wave signal, which is in phase with the carrier wave signal X, changes in level between 0 and $-EMAX$, and has a constant frequency, are respectively supplied to the comparators C1 and C2, and the PWM control input signal ei changes stepwise at the point a.

In this case, the comparators C1 and C2 respectively compare the PWM control input signal ei with the triangular wave signals X and Y, and form the gate signals g1 and g2 in the following manner:

When $ei > X$, $g1 = 1$.
When $ei \leq X$, $g1 \times 0$.
When $ei \geq Y$, $g2 = 0$,
When $ei < Y$, $g2 = 1$.

The monostable multivibrator MM1 is operated at the trailing edge of the gate signal g1 and outputs a "0"-level signal for the time interval $\Delta tM$. Similarly, the monostable multivibrator MM2 is operated at the tailing edge of the gate signal g2 and outputs a "0"-level signal for the time interval $\Delta tM$.

The AND circuit AND 1 calculates the logical AND between the gate signal g1 and an output signal m2 from the monostable multivibrator MM2 and outputs the new gate signal g11. The AND circuit AND2 calculates the logical AND between the gate signal g2 and an output signal m1 from the monostable multivibrator MM1 and outputs the new gate signal g22. That is, the AND circuits AND1 and AND2 output the signals represented by the following equations:

$$g11 = g1 \cdot m2; \quad g22 = g2 \cdot m1$$

The elements S1, S2, S3, and S4 constituting the inverter apparatus are ON/OFF-controlled by the new gate signals g11 and g22 as follows:

When $g11 = 1$, the element S1 is turned on (the element S3 is turned off).
When $g11 = 0$, the element S3 is turned on (the element S1 is turned off).
When $g22 = 0$, the element S2 is turned on (the element S4 is turned off).
When $g22 = 1$, the element S4 is turned on (the element S2 is turned off).

The output voltage Vu from the inverter apparatus changes upon ON/OFF operations of the elements S1, S2, S3, and S4 in the following manner. Note that the total DC voltage is represented by Vd, and $Vd1 = Vd2 = Vd/2$.

When the elements S1 and S2 are turned on, $Vu = +Vd/2$.
When the elements S2 and S3 are turned on, $Vu = 0$.
When the elements S3 and S4 are turned on, $Vu = -Vd/2$.

That is, a three-level output voltage is obtained. The average value Vu is proportional to the input signal ei.

Assume that the level of the input signal ei abruptly changes at the point a. In this case, since the pulse width of the gate signal g1 becomes shorter than the minimum ON time $\Delta t$ of the element S1, the signal g1 is converted into the new gate signal g11 indicated by a dotted line in FIG. 8 to secure the minimum ON time $\Delta t$.

Although the gate signal g2 changes to "1" at the time point a, since the output m1 from the monostable multivibrator MM1 is set at "0", the new gate signal g22 is kept at "0" for the set time $\Delta tM$ of the monostable multivibrator MM1.

As shown in FIG. 9, which is an enlarged view showing waveforms near the point a, even if the monostable multivibrator MM1 is operated at the point a to output the signal $m1 = 0$ for the time interval $\Delta tM$ and the level of the gate signal g2 is changed from "0" to "1" at the point a, the new gate signal g22 is kept at "0". Although the pulse width of the other new gate signal g11 is increased by an amount corresponding to the element minimum ON time $\Delta t$, the occurrence of the mode which poses one of the conventional problems can be prevented by setting $\Delta tM > \Delta t$.

Although the element S1 is turned on when $g11 = 1$, whenever $g11 = 1$. $g22 = 0$, and whenever the element S1 is turned on, the element S2 is turned on as indicated by FIG. 9, thereby preventing application of a total DC voltage to the element S2. Similarly, $g11 = 0$, whenever g22=1, and the element is turned on whenever the element S3 is turned on, thus preventing application of a total DC voltage to the element S3.

In other words, while the element S2 is OFF, the element S1 is OFF. In this case, if the output current Iu from the inverter apparatus shown in FIG. 6 flows in the direction indicated by the arrow, the diodes D3 and D4 are rendered conductive, so that the total voltage Vd is applied to the series circuit of the elements S1 and S2. However, since both the elements are OFF, a voltage Vd/2 is applied to each element. Similarly, when the element S3 is OFF, the element S4 is OFF so that a voltage exceeding Vd/2 is not applied to each element.

According to a conventional PWM control device, if the input signal ei abruptly changes, there may be an error that the total DC voltage Vd is applied to one of the elements S2 and S3, of the elements S1 to S4, which are located at the intermediate positions. According to the present invention, however, such an error can be eliminated.

In the control device of the neutral point clamped power inverter apparatus according to the above-described embodiment, even if the level of a PWM control input signal abruptly changes, control can be performed to avoid the mode of applying a total DC voltage to one element, thereby eliminating the possibility of element damage.

Still another embodiment of the present invention will be described below with reference to FIG. 10. Since the inverter apparatus of this embodiment has the same circuit arrangement of the previous embodiment, the same reference numerals denote the same parts in both the embodiments, and a description thereof will be omitted.

According to a control circuit of this embodiment, the output terminal of a comparator Cu for comparing a load current Iu with a current designation value Iu* is connected to one input terminal of each of comparators C1 and C2 through a current control compensation circuit Gu(s). The other input terminal of each of the comparators C1 and C2 is connected to a corresponding one of the X and Y output terminals of a triangular wave generator TRG. The output terminals of the comparators C1 and C2 are respectively connected to the input terminals of Schmitt circuits SH1 and SH2. The output terminal of the Schmitt circuit SH1 is connected to one input terminal of an AND circuit AND1 and the input terminal of an inverter IV1, whereas the output terminal of the Schmitt circuit SH2 is connected to one input terminal of an AND circuit AND4 and the input terminal of an inverter IV2. The output terminal of each of the inverters IV1 and IV2 is connected to one input terminal of a corresponding one of AND circuits AND3 and AND2.

The output terminal of a hysteresis circuit HS, to which the load current Iu is supplied, is connected to the other input terminal of each of the AND circuits AND1 and AND2 and is also connected to the other input terminal of each of the AND circuits AND3 and AND4 through an inverter IV3.

Figure 10:
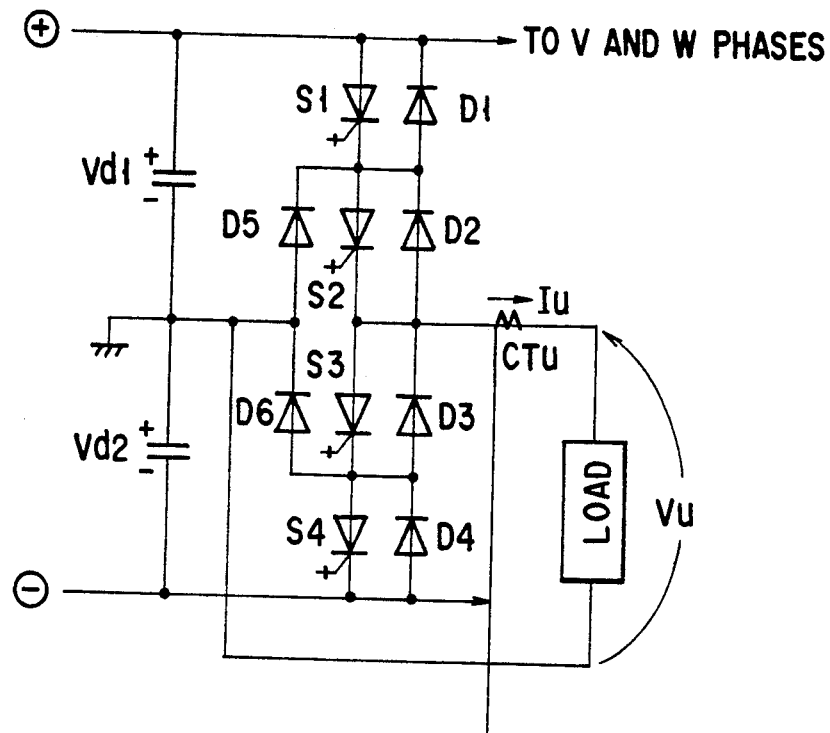
FIG. 10 is a block diagram showing a control device of the neutral clamped power inverter apparatus according to still another embodiment of the present invention together with the arrangement of the main circuit of the apparatus.
Figure 10:
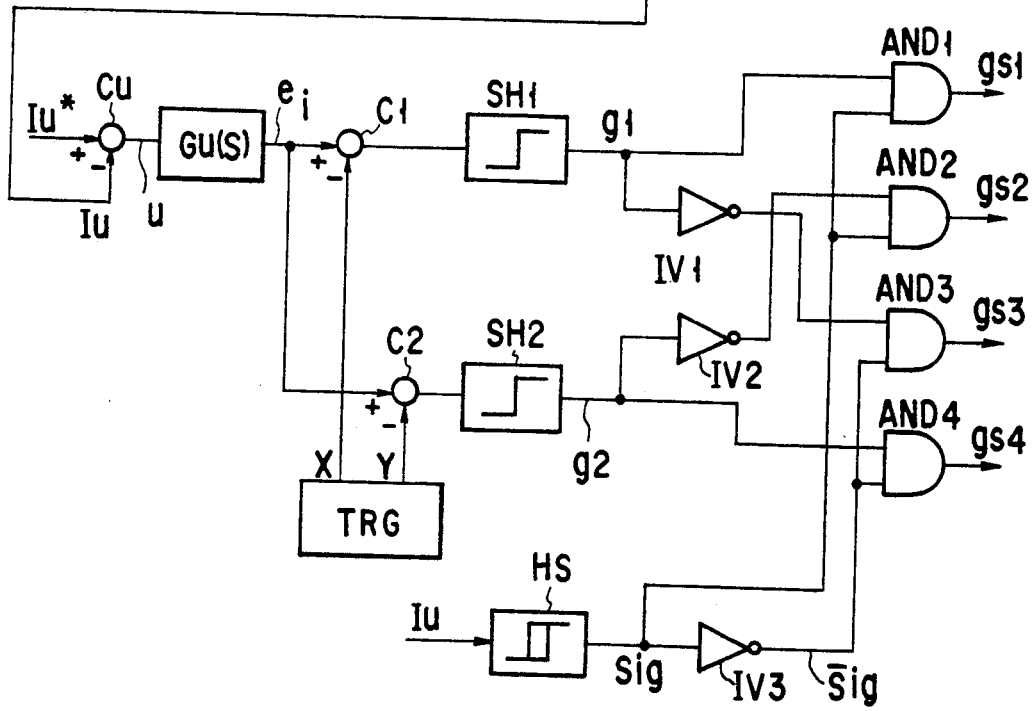

In the circuit shown in FIG. 10, when the U-phase load current Iu is detected by the current detector CTu and is input to the comparator Cu of the current control circuit, the comparator Cu compares the current designation value Iu* with the current detection value Iu to obtain a deviation $\epsilon u = Iu^* - Iu$. The deviation $\epsilon u$ is amplified by the current control compensation circuit Gu(s). The amplified deviation is then input, as an input signal ei for PWM control, to the comparators C1 and C2.

The comparator C1 compares a triangular wave signal X from the triangular wave generator TRG with the input signal ei and supplies the comparison result to the Schmitt circuit SH1. With this operation, a gate signal g1 for elements S1 and S3 is output from the Schmitt circuit SH1. Similarly, the comparator C2 compares a triangular wave signal Y from the triangular wave generator TRG with the input signal ei and supplies the comparison result to the Schmitt circuit SH2. With this operation, a gate signal g2 for elements S2 and S4 is formed.

The hysteresis circuit HS serves to detect the direction of the output current Iu from the inverter apparatus, and outputs a signal sig as follows:

When $Iu > 0$, sig=1.
When $Iu < 0$, sig=0.

The signals g1, g2, and sig are logically processed by the inverters IV1 to IV3 and the AND circuits AND1 to AND4 in the following manner to form gate signals gs1 to gs4 for the elements S1 to S4:

$gs1 = g1 \cdot sig$
$gs2 = g2 \cdot \overline{sig}$
$gs3 = \overline{g1} \cdot \overline{sig}$
$gs4 = g2 \cdot \overline{sig}$ An operation of the device shown in FIG. 10 will be described below with reference to the timing chart in FIG. 11.

The PWM control carrier wave signal X as a triangular wave signal, which changes in level between 0 and +EMAX and has a constant frequency, and the carrier wave signal Y as a triangular wave signal, which is in phase with the carrier wave signal X, changes in level between 0 and −EMAX, and has a constant frequency, are respectively supplied to the comparators C1 and C2. With this operation, the PWM control input signal ei and the triangular wave signals X and Y are compared with each other to form the following signals g1 and g2:

When $ei > X$, g1=1.
When $ei < X$, g1=0.
When $ei < Y$, g2=1.
When ei 22 Y, g2=0.

Figure 11:
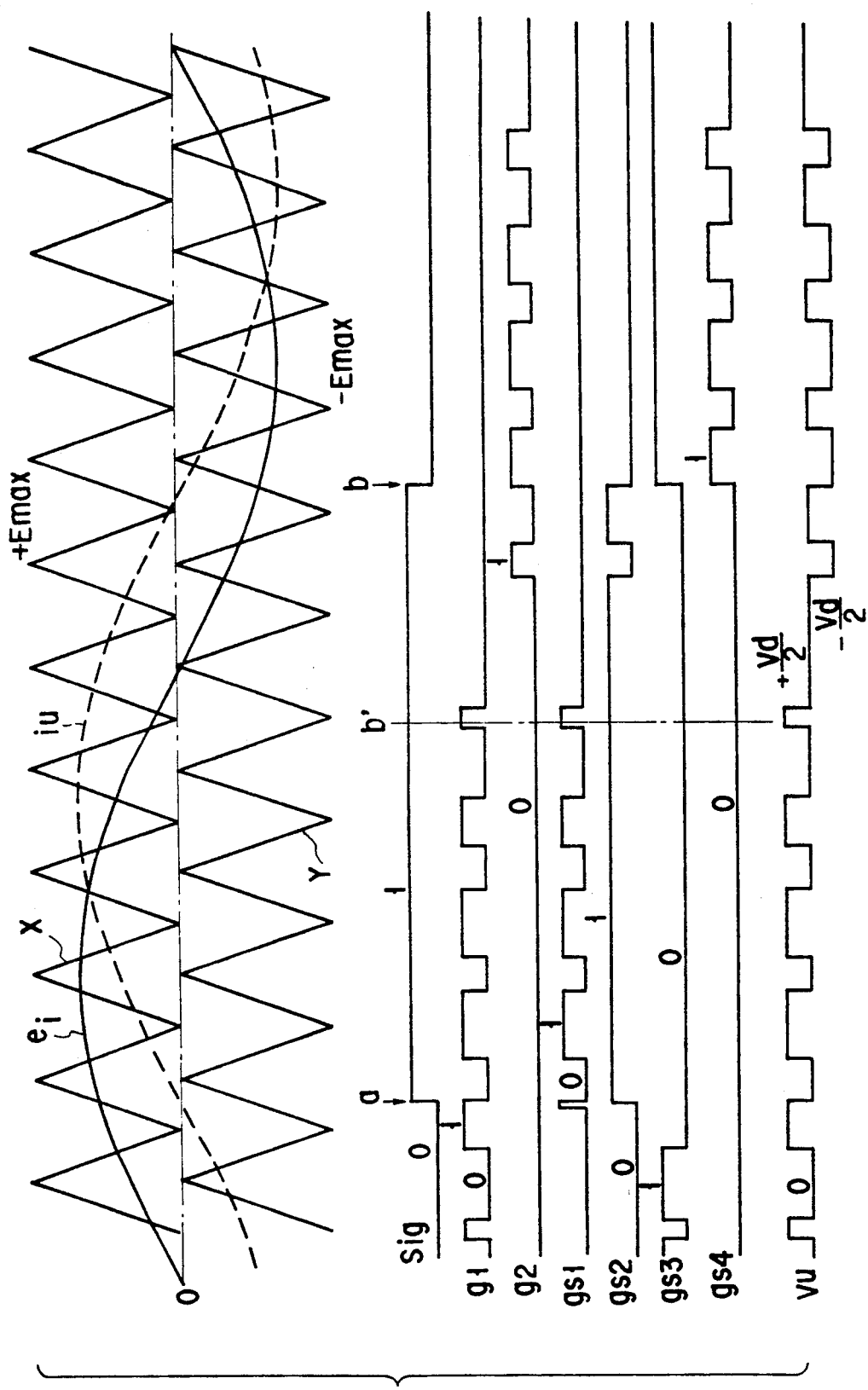
FIG. 11 is a timing chart for explaining an operation of the device in FIG. 10.

If the output current Iu from the inverter apparatus changes in the manner indicated by the dotted line in FIG. 11, the level of the output signal sig from the hysteresis circuit HS is changed from "0" to "1" at a point a, and from "1" to "0" at a point b. In this case, the gate signal gs1 for the element S1 changes as follows:

When sig=1 (Iu>0), gs1=g1 is set to turn on and off the element S1.

When sig=0 (Iu<0), gs1=0 is set to turn off the element S1.

The gate signal gs2 for the element S2 changes as follows:

When sig=1 (Iu≧0), gs2=g2 is set to turn on and off the element S2.

When sig=0 (Iu<0), gs2=0 is set to turn off the element S2.

The gate signal gs3 for the element S3 changes as follows:

When sig=0 (Iu<0), gs3=g1 is set to turn on and off the element S3.

When sig=1 (Iu≧0), gs3=0 is set to turn off the element S3.

The gate signal gs4 for the element S4 changes as follows:

When sig=0 (Iu<0), gs4=g2 is set to turn on and off the element S4.

When sig=1 (Iu≧0), gs4=0 is set to turn off the element S4.

That is, when Iu≧0, the elements S3 and S4 on the lower side are turned off, while the elements S1 and S2 on the upper side are ON/OFF-operated in accordance with the original signals g1 and g2, thereby performing PWM control.

When Iu<0, the elements S1 and S2 on the upper side are turned off, while the elements S3 and S4 on the lower side are ON/OFF-operated in accordance with the original signals g1 and g2, thereby performing PWM control.

With this operation, a conventional idle time $\Delta t D$ is not required, and the output voltage Vu from the inverter apparatus has the waveform based on the original signals g1 and g2 obtained by comparing the PWM control triangular wave signals X and Y with the input signal ei. The average value of the output voltage Vu is proportional to the input signal ei.

The device shown in FIG. 10 is designed to determine the direction of an output current by detecting the actual current Iu. In this case, if the output current includes ripple components, the current is frequently switched to positive and negative levels near the zero point. This makes the determination difficult.

For this reason, when an output current from the inverter apparatus is to be controlled, it is preferable that the direction of the output current be determined by using a current reference signal Iu*. Since the current reference signal Iu* includes no ripple components, determination of the zero point can be easily performed. Especially if it is considered that Iu=Iu* is set by current control, determination of a direction includes only a small amount of error. Even if a slight phase shift occurs, the current control waveform is slightly distorted so that there is no possibility of element damage.

As has been described above, in the control device of the neutral point clamped power inverter apparatus according to the present invention, the mode of short-circuiting a DC power supply is eliminated by turning off one of the two self-extinction elements on the upper side or of the two self-extinction elements on the lower side in accordance with the direction of an output current from the inverter. Therefore, the idle time which is required in the conventional device need not be set. Therefore, there is provided a control device of a neutral point clamped power inverter apparatus, in which the utilization efficiency of the inverter apparatus is improved, a reduction in size and weight or cost of the apparatus can be achieved, and external disturbance to the current control system due to the idle time can be prevented so that a sine wave current free from distortion can be supplied to a load.

In the above-described embodiments, control of the U-phase inverter is exemplified. However, the present invention can also be applied to V- and W-phase inverters. In addition, the present invention can be applied to a three-phase NPC inverter apparatus for supplying power to a three-phase three-wire load, as shown in FIG. 12.

Figure 12:
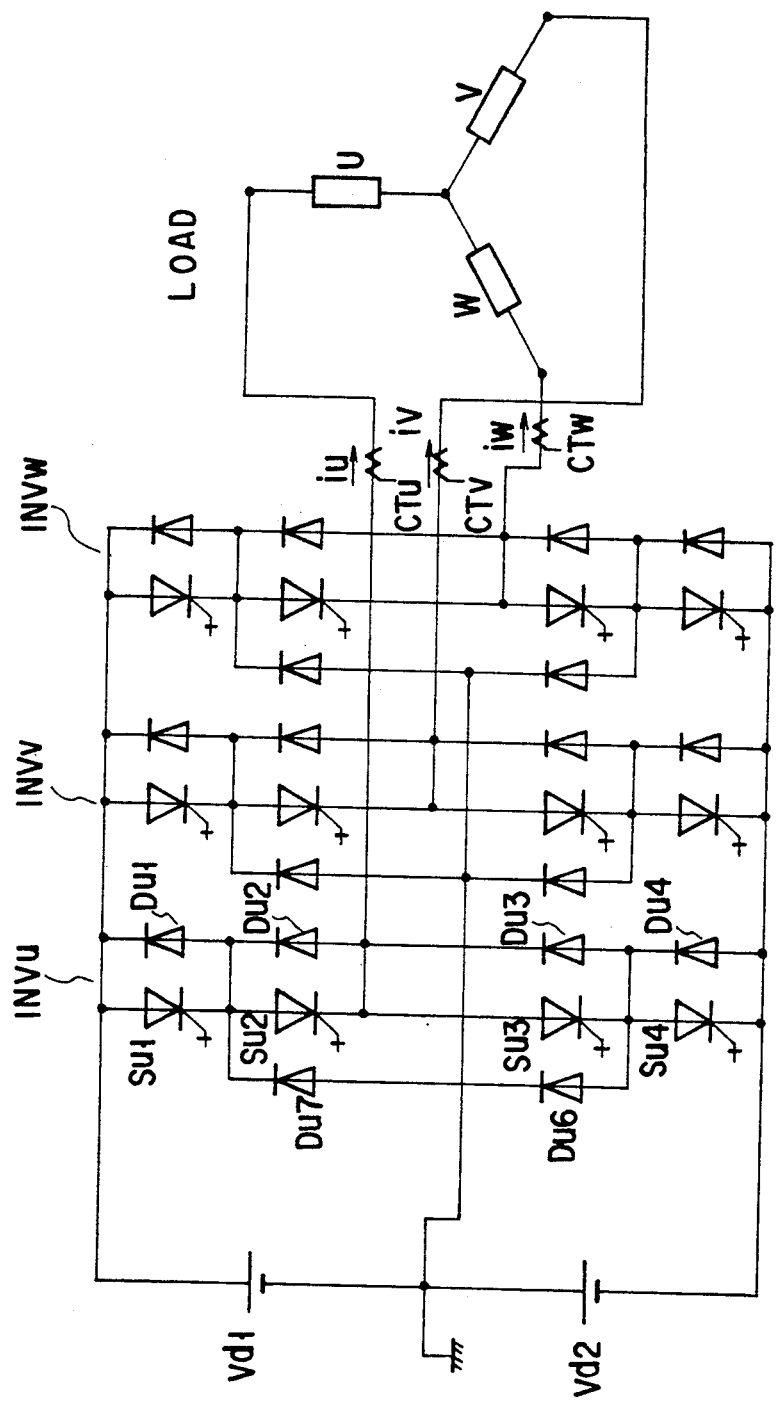
FIG. 12 is a circuit diagram showing a neutral point clamped three-phase power inverter apparatus to which the present invention is applied.

According to the three-phase NPC inverter apparatus shown in FIG. 12, U-, V-, and W-phase inverter circuits INVu, INVv, and INVw are connected in parallel with a series circuit of DC power supplies Vd1 and Vd2. Each of the inverter circuits INVu, INVv, and INVw has the same circuit arrangement as that of the U-phase inverter circuit described with reference to the above embodiments. The output terminals of the inverter circuits are respectively connected to the terminals of a three-phase load LOAD.

Each inverter circuit of the three-phase NPC inverter apparatus is controlled by one of the control devices described with reference to the above embodiments.

In the above embodiments, the carrier wave signals X and Y have constant frequencies. It is, however, apparent that the present invention can be applied to a case wherein the carrier wave signals X and Y have variable frequencies, as long as the carrier wave signals are in phase with each other.

The present invention is represented by the control block diagram of hardware for the sake of descriptive convenience. However, it is apparent that the present invention can be realized by arithmetic operations by means of software using a microcomputer or the like.

Furthermore, in the above embodiments, the present invention is applied to the inverter apparatus for converting DC power into AC power. However, the present invention can be applied to a converter apparatus for converting AC power into DC power.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A power inverter control device for controlling a neutral point clamped power inverter apparatus including first to fourth self-extinction elements sequentially connected in series between two end terminals of a power supply having an intermediate terminal, four freewheeling diodes connected in parallel with said self-extinction elements in a direction opposite thereto, a series circuit of first and second clamping diodes, connected in parallel with a series circuit of said second and third self-extinction elements in a direction opposite thereto and having a node connected to the intermediate terminal of said power supply, said control device comprising:

first PWM control signal generating means for generating a first PWM control signal having a pulse width corresponding to an input signal level; and second PWM control signal generating means for converting the first PWM control signal into a second PWM control signal having a pulse width equivalent to the sum of the pulse width of the first PWM control signal and a width corresponding to one of turn-on and turn-off periods of each of said self-extinction elements, and supplying the second PWM control signal to said first to fourth self-extinction elements.

2. A device according to claim 1, wherein said first PWM control signal generating means comprises detection means for detecting a current, supplied from said inverter apparatus to a load, as a current detection value, and deviation signal output means for outputting a deviation signal, as the first PWM control signal, which corresponds to a difference between an externally supplied current designation value signal and the current detection value.

3. A device according to claim 2, wherein said deviation signal output means comprises a comparator for comparing the current designation value signal with the input signal and outputting a difference signal, and means for amplifying the difference signal from said comparator and outputting the deviation signal.

4. A device according to claim 1, wherein said second PWM control signal generating means comprises limiter means for dividing the first PWM control signal into positive and negative signals, bias means for adding a predetermined bias voltage to the positive and negative signals output from said limiter means, and outputting the biased positive and negative signals, triangular wave generating means for generating a first triangular wave signal which changes in level on a positive side, and a second triangular wave signal which has the same frequency and phase as those of the first triangular wave signal, and changes in level on a negative side, and control means for comparing the positive and negative signals with the first and second triangular wave signals to obtain differences, respectively, and ON/OFF-controlling said first and third self-extinction elements and said second and fourth self-extinction elements by using the two second PWM control signals corresponding to the differences.

5. A device according to claim 4, wherein said limiter means comprises a first limiter for extracting the positive signal from the first PWM control signal, and a second limiter for extracting the negative signal from the first PWM control signal.

6. A power inverter control device for controlling a neutral point clamped power inverter apparatus including first to fourth self-extinction elements sequentially connected in series between two end terminals of a power supply having an intermediate terminal, four freewheeling diodes connected in parallel with said self-extinction elements in a direction opposite thereto, a series circuit of first and second clamping diodes, connected in parallel with a series circuit of said second and third self-extinction elements in a direction opposite thereto and having a node connected to the intermediate terminal of said power supply, said control device comprising:

triangular wave signal generating means for generating a first triangular wave signal which changes in level on a positive side, and a second triangular wave signal which is in phase with the first triangular wave signal and changes in level on a negative side; and control means for comparing a control signal with the first and second triangular wave signals from said triangular wave signal generating means to generate at least first and second gate signals, each having a pulse width corresponding to a level of the input signal, and ON/OFF-controlling said self-extinction elements by using the control signals.

7. A device according to claim 6, wherein said control means comprises detection means for detecting a current, supplied from said inverter apparatus to a load, as a current detection value, deviation signal output means for outputting a deviation signal corresponding to a difference between an externally supplied current designation value signal and the current detection value, and control signal output means for comparing the deviation signal with the first and second triangular wave signals and outputting the first and second gate signals.

8. A device according to claim 7, wherein said control signal output means comprises means for outputting first and second gate signals, each having at least a pulse width corresponding to one of turn-on and turn-off periods of each of said self-extinction elements.

9. A device according to claim 7, wherein said deviation signal output means comprises a comparator for comparing the current designation value signal with the the current detection value and outputting a difference signal, and means for amplifying the difference signal from said comparator and outputting the deviation signal.

10. A device according to claim 7, wherein said control means further comprises first and second monostable multivibrators for generating first and second pulse signals, each having a pulse width longer than a minimum ON time, in response to trailing edges of the first and second gate signals, respectively, and means for generating a first AND signal based on the first gate signal and the second pulse signal, and a second AND signal based on the second gate signal and the first pulse signal, and said control means controls said self-extinction elements by using the first and second AND signals.

11. A power inverter control device for controlling a neutral point clamped power inverter apparatus including first to fourth self-extinction elements sequentially connected in series between two end terminals of a power supply having an intermediate terminal, four freewheeling diodes connected in parallel with said self-extinction elements in a direction opposite thereto, a series circuit of first and second clamping diodes, connected in parallel with a series circuit of said second and third self-extinction elements in a direction opposite thereto and having a node connected to the intermediate terminal of said power supply, said control device comprising:

gate signal supplying means for supplying gate signals to said self-extinction elements to switch a positive output mode in which said first and second self-extinction elements are ON, a zero output mode in which said second and third self-extinction elements are ON, and a negative output mode in which said third and fourth self-extinction elements are ON, in such a manner that switching from the positive mode to the negative mode and vice versa is always performed through the zero output mode.

12. A device according to claim 11, wherein said gate signal supplying means comprises triangular wave signal generating means for generating a first triangular wave signal which changes in level between zero and a maximum value on a positive side, and a second triangular wave signal which is in phase with the first triangular wave signal and changes in level between zero and a minimum value on a negative side, and means for comparing a control signal with the first and second triangular wave signals from said triangular wave signal generating means, generating a first gate signal having a pulse width corresponding to a positive level of the control signal, and a second gate having a pulse width corresponding to a negative level of the control signal, and supplying the control signals to said self-extinction elements.

13. A device according to claim 11, wherein said gate signal supplying means comprises means for allowing only one of the PWM control signals to pass therethrough when the first and second gate signals overlap each other.

14. A device according to claim 11, wherein said gate signal supplying means comprises means for outputting the control signal having at least a pulse width corresponding to one of turn-on and turn-off periods of each of said self-extinction elements.

15. A power inverter control device for controlling a neutral point clamped power inverter apparatus including first to fourth self-extinction elements sequentially connected in series between two end terminals of a power supply having an intermediate terminal, four freewheeling diodes connected in parallel with said self-extinction elements in a direction opposite thereto, a series circuit of first and second clamping diodes, connected in parallel with a series circuit of said second and third self-extinction elements in a direction opposite thereto and having a node connected to the intermediate terminal of said power supply, said control device comprising:

current direction detecting means for detecting a direction of an output current from said power inverter apparatus, and outputting first and second detection signals respectively corresponding to a first direction and a second direction opposite thereto; and means for turning off said first and second self-extinction elements in response to the first detection signal, and turning off said third and fourth self-extinction elements in response to the second detection signal.

16. A device according to claim 15, further comprising triangular wave generating means for generating a first triangular wave signal which changes in level on a positive side, and a second triangular wave signal which is in phase with the first triangular wave signal and changes in level on a negative side, and means for comparing a control signal with the first and second triangular wave signals from said triangular wave generating means, generating a first gate signal having a pulse width corresponding to a positive level of the control signal, and a second gate signal having a pulse width corresponding to a negative level of the control signal, and ON/OFF-controlling said self-extinction elements by using the control signals.

17. A device according to claim 15, wherein said control means comprises means for outputting the first and second gate signals, each having at least a pulse width corresponding to one of turn-on and turn-off periods of each of said self-extinction elements.

18. A power inverter control device for controlling a neutral point clamped power inverter apparatus designed to supply power to a three-phase load and constituted by three inverter circuits, each including first to fourth self-extinction elements sequentially connected in series between two end terminals of a power supply having an intermediate terminal, four freewheeling diodes connected in parallel with said self-extinction elements in a direction opposite thereto, a series circuit of first and second clamping diodes, connected in parallel with a series circuit of said second and third self-extinction elements in a direction opposite thereto and having a node connected to the intermediate terminal of said power supply, said control device comprising:

first PWM control signal generating means, arranged with respect to each phase of the three-phase load, for generating a first PWM control signal having a pulse width corresponding to an input signal level corresponding to a load current; and second PWM control signal generating means for converting the first PWM control signal into a second PWM control signal having a pulse width equivalent to the sum of the pulse width of the first PWM control signal and a width corresponding to one of turn-on and turn-off periods of each of said self-extinction element, and supplying the second PWM control signal to said first to fourth self-extinction elements.

* * * * *